United States Patent [19]
Oshima et al.

[11] Patent Number: 5,280,075
[45] Date of Patent: Jan. 18, 1994

[54] CORE-SHELL POLYMER AND ITS USE

[75] Inventors: Junji Oshima, Toyonaka; Tatsuo Fujii, Nagaokakyo; Minoru Yamada, Kawanishi, all of Japan

[73] Assignee: Takeda Chemical Industries, Ltd., Osaka, Japan

[21] Appl. No.: 600,983

[22] Filed: Oct. 23, 1990

[30] Foreign Application Priority Data

Oct. 23, 1989 [JP] Japan .................. 1-276493

[51] Int. Cl.$^5$ ............................ C08F 265/02
[52] U.S. Cl. ........................ 525/301; 525/183; 525/902; 523/201
[58] Field of Search ............ 523/201; 525/301, 183, 525/902

[56] References Cited

U.S. PATENT DOCUMENTS

| | | | |
|---|---|---|---|
| 3,668,274 | 6/1972 | Owens et al. | 525/301 |
| 3,944,630 | 3/1976 | Ide et al. | 525/193 |
| 4,495,324 | 1/1985 | Chacko et al. | 525/66 |
| 4,584,344 | 4/1986 | Baer | 525/66 |
| 4,594,363 | 6/1986 | Blakenship et al. | 521/64 |
| 4,707,513 | 11/1987 | Baer | 524/504 |
| 4,920,160 | 4/1990 | Chip et al. | 523/201 |
| 4,985,469 | 1/1991 | Chip et al. | 521/64 |

FOREIGN PATENT DOCUMENTS

| | | |
|---|---|---|
| 0022633 | 1/1981 | European Pat. Off. |
| 0051471 | 5/1982 | European Pat. Off. |
| 0259097 | 3/1988 | European Pat. Off. |
| 55-135157 | 10/1980 | Japan |
| 57-34153 | 2/1982 | Japan |
| 2050392 | 1/1981 | United Kingdom |

*Primary Examiner*—John Kight, III
*Assistant Examiner*—Rachel Johnson
*Attorney, Agent, or Firm*—Wenderoth, Lind & Ponack

[57] ABSTRACT

The invention provides a core-shell polymer which comprises (a) a core phase having carboxyl groups on surface part of the core and (b) a shell phase which is a glassy polymer containing neither functional groups reactive to the carboxyl group nor functional groups reactive to the amino group, wherein the toluene-soluble fraction is not higher than 10% by weight based on the whole core-shell polymer; polyamide resin compositions comprising said core-shell polymer; and molded articles produced by molding said compositions.

Impact strength of the resin composition or its molded articles was improved by using the core-shell polymer.

6 Claims, No Drawings

CORE-SHELL POLYMER AND ITS USE

This invention relates to a core-shell polymer capable of providing a polyamide resin or a polymer alloy containing polyamide resin with impact strength and to compositions containing such a resin or an alloy with good impact strength provided by said core-shell polymer. It provides materials suited for use in the fields of automobiles, OA (office automation) apparatus and household electric and electronic appliances, among others.

TECHNOLOGICAL BACKGROUND OF THE INVENTION

Polyamide resins have excellent thermal deformation resistance, rigidity and oil resistance and are used in electric appliance parts and automobile parts. Further improvement in impact strength and water resistance is desired, however.

As regards the impact strength, in particular, various attempts have already been made, including, more specifically, the use of ABS resins and modified polyolefins.

On the other hand, impact modifiers of the core-shell polymer type have been proposed, with a rubbery polymer as the core and a glassy polymer as the shell. Impact modifiers of this kind show good dispersibility in resins and it is relatively easy to attain reproducibility from the morphology viewpoint.

A core-shell polymer for improving the impact strength of polyamide resins has already been proposed in U.S. Pat. No. 3,668,274 AND EP-51,471, each of which polymer contains carboxyl groups in the shell phase. Compositions composed of this carboxyl-modified core-shell polymer and nylon 6 indeed show good notched Izod impact strength (thickness: ⅛ inch) at temperatures not lower than 23° C. but still have problems: the impact strength is low and the melt viscosity is high. The latter fact offers a problem from the moldability viewpoint.

In the pigment-related technical field, core-shell polymers whose core and shell phases are both modified with a carboxylic acid(s) are known (Japanese Kokai Tokkyo Koho Nos. 63-213509 and 61-185505). However, they cannot be used as impact modifiers for polyamide resins.

DETAILED DESCRIPTION OF THE INVENTION

The present inventors made intensive investigations in search of a core-shell polymer capable of providing a polyamide resin composition with good impact strength and as a result, found that the above problems can be solved by melt-blending a core-shell polymer having the constitution mentioned below with a polyamide resin. Based on this finding, they have now completed the present invention.

Thus the invention provides a core-shell polymer which comprises (a) a core phase having carboxyl groups on surface part of the core and (b) a shell phase which is a glassy polymer containing neither functional groups reactive to the carboxyl group nor functional groups reactive to the amino group, wherein the toluene-soluble fraction of the core-shell polymer is not higher than 10% by weight based on the whole core-shell polymer; polyamide resin compositions comprising said core-shell polymer; and molded articles produced by molding said compositions.

In accordance with the invention, the core is a rubbery polymer or is composed of a rubbery polymer phase and an external phase around the former and, in either case, the core has carboxyl groups on its surface part thereof.

In cases where the core is a rubbery polymer alone, the core-shell polymer according to the invention is produced in at least two steps of emulsion polymerization.

In the first step polymerization, a core phase consisting of a rubbery polymer having a glass transition temperature not higher than $-30°$ C. is formed by polymerization of a conjugated diene monomer or an alkyl acrylate monomer containing 2 to 8 carbon atoms in the alkyl moiety, or a mixture of such monomers.

If the core has a glass transition temperature above $-30°$ C., the impact strength at low unsatisfactory in certain instances.

As such conjugated diene, there may be mentioned, for instance, butadiene, isoprene, chloroprene, etc. Among them, butadiene is particularly preferred.

As the alkyl acrylate with 2 to 8 carbon atoms in the alkyl moiety, there may be mentioned, for example, ethyl acrylate, propyl acrylate, butyl acrylate, cyclohexyl acrylate 2-ethylhexyl acrylate, etc. In particular, butyl acrylate is preferred.

In the first step polymerization, the conjugated diene(s) and/or alkyl acrylate(s) may be copolymerized with a monomer or monomers copolymerizable therewith, for example aromatic vinyl or aromatic vinylidene compounds such as styrene, vinyltoluene, α-methylstyrene, etc.; vinyl cyanide or vinylidene cyanide compounds such as acrylonitrile, methacrylonitrile, etc.; and alkyl methacrylates such as methyl methacrylate, butyl methacrylate, etc.

As the carboxyl-containing monomer, there may be mentioned such monocarboxylic acids, dicarboxylic acid, mono-alkyl-ester of dicarboxylic acid, etc.

Such monocarboxylic acids have vinyl group(s) in the molecule, and are examplified by acrylic acid, methacrylic acid, α-hydroxymethylacrylic acid, etc.

Such dicarboxylic acids are also unsaturated, and are examplified by maleic acid, fumaric acid, itaconic acid, citraconic acid, mesaconic acid, aconitic acid, methylenemalonic acid, α-methyleneglutaric acid, etc. Particularly preferred, however, are methacrylic acid and itaconic acid.

Such mono-alkyl ester of dicarboxylic acids are also unsaturated, and contain alcoholic residue having 1 to 6 carbon atoms. Preferably monoethyl maleate is used.

The carboxyl-containing monomer is used in an amount within the range of 0.2 to 30% by weight, preferably 0.2 to 10% by weight, based on the core phase. For efficient use, in smaller amounts, of the carboxyl-containing monomer, it is preferable to conduct the polymerization in a manner such that a concentration gradient is produced with respect to the carboxyl-containing monomer in the core phase with the concentration thereof increasing with the approach to the shell phase.

In cases where no conjugated diene is involved in the first step polymerization or a conjugated diene or dienes are involved in said step only in an amount not more than 20% based on the total monomer amount in the first step, high impact strength at low temperature can be attained by using a crosslinking monomer and a grafting monomer each in a small amount.

As the crosslinking monomer, there may be mentioned, for example, aromatic divinyl monomers such as divinylbenzene, etc.; and alkane polyol polyacrylates and alkane polyol polymethacrylates such as ethylene glycol diacrylate, ethylene glycol dimethacrylate, butylene glycol diacrylate, butylene glycol dimethacrylate, hexanediol diacrylate, hexanediol dimethacrylate, oligoethylene glycol diacrylate, oligoethylene glycol dimethacrylate, trimethylolpropane diacrylate, trimethylolpropane dimethacrylate, trimethylolpropane triacrylate, trimethylolpropane trimethacrylate, etc. Particularly preferred are butylene glycol diacrylate and hexanediol diacrylate.

As the grafting monomer, there may be mentioned, among others, unsaturated carboxylic acid allyl esters, such as allyl acrylate, allyl methacrylate, diallyl maleate, diallyl fumarate, diallyl itaconate, etc. In particular, allyl methacrylate is preferred.

Such crosslinking monomer and grafting monomer are used each in an amount within the range of 0.01 to 5% by weight, preferably 0.1 to 2% by weight, based on the total monomer amount for the core.

The core phase should preferably account for 50 to 90% by weight based on the core-shell polymer as a whole. When the amount of the core phase is outside this weight range, namely below 50% or above 90%, the impact strength of resin compositions obtained by melt blending the resulting core-shell polymer with polyamide resins may be unsatisfactory in some instances.

The second-step polymerization is for the formation of the so-called shell.

In the polymerization of the shell phase, a monomer or monomers containing neither functional groups reactive to the carboxyl group nor functional groups reactive to the amino group are polymerized to give a glassy polymer with a glass transition temperature of not lower than 40° C.

When the core-shell phase has a glass transition temperature below 40° C., handling of the core-shell polymer may become very difficult in the steps of removal of water and drying to melt-blending with resins due to the tackiness of said polymer, hence may become impracticable. The shell phase should preferably have a glass transition temperature not lower than 60° C.

As the functional groups reactive to the carboxyl group, there may be mentioned a number of polar groups such as amino, imino, epoxy and hydroxyl groups.

As the functional groups reactive to the amino group, there may be mentioned a number of groups such as carboxyl, epoxy and isocyanato groups.

In accordance with the invention, the shell phase is produced by using a monomer or monomers containing neither of such functional groups reactive to the carboxyl group and functional groups reactive to the amino group as mentioned above.

As the monomers containing neither functional groups reactive to the carboxyl group nor functional groups reactive to the amino group which are to be used in the polymerization of the shell phase, there may be mentioned, among others, alkyl acrylates such as ethyl acrylate and butyl acrylate, etc.; alkyl methacrylates such as methyl methacrylate, butyl methacrylate, etc.; aromatic vinyl or vinylidene compounds such as styrene, vinyltoluene, α-methylstyrene, etc.; vinyl or vinylidene cyanides such as acrylonitrile, methacrylonitrile, etc.; and other polymerizable vinyl monomers. Particularly preferred among them are methyl methacrylate, styrene and acrylonitrile. This shell phase should preferably account for 10 to 50% by weight based on the core-shell polymer as a whole.

When the amount of this shell phase is outside the above range, namely below 10% or above 50%, the impact strength of the resin compositions obtained by melt-blending the product core-shell polymer with polyamide resins may not be improved to a satisfactory extent.

In the practice of the invention, the core may consist of a rubbery polymer phase and a further phase external to said rubbery polymer phase. In that case, at least three steps of emulsion polymerization are required for the production of the core-shell polymer according to the invention.

The first step polymerization gives a rubbery polymer, the second-step polymerization gives a carboxyl-containing polymer externally to the rubbery polymer, and the third-step polymerization gives a shell phase.

In the first-step polymerization, a conjugated diene or an alkyl acrylate containing 2 to 8 carbon atoms in the alkyl group thereof, or a mixture of such monomers is polymerized to give a rubbery polymer having a glass transition temperature of not higher than −30° C.

As examples of the conjugated diene or $C_{2-8}$ alkyl acrylate which are usable in the first-step polymerization, there may be mentioned those examples given hereinabove.

A monomer or monomers copolymerizable with the conjugated diene and/or alkyl acrylate as well as a crosslinking monomer and a grafting monomer may also be used, just as mentioned hereinabove.

In the second-step polymerization, a carboxyl containing polymer phase is formed on the outside of the rubbery polymer using a carboxyl-containing monomer.

As examples of the carboxyl-containing monomer, those mentioned hereinabove may be mentioned. In this case, the carboxyl-containing monomer may be used either alone or in combination with another monomer or other monomers for copolymerization.

The copolymerizable monomer is free of carboxyl-reactive groups.

Such copolymerizable monomers are exemplified for alkyl acrylates such as ethyl acrylate, butyl acrylate, etc.; alkyl methacrylates such as methyl methacrylate, butyl methacrylate, etc.; aromatic vinyl or vinylidene compounds such as styrene, vinyltoluene, α-methylstyrene, etc.; vinyl or vinylidene cyanides such as acrylonitrile, methacrylonitrile, etc.; and other polymerizable vinyl monomers free of carboxyl-reactive groups. Preferred among them are ethyl acrylate, butyl acrylate and methyl acrylate.

Furthermore, it is also possible to use, in appropriate amounts, those crosslinking monomers and grafting monomers given as examples with respect to the first-step polymerization.

An amount of the carboxyl-containing monomer content in this step should account for 1 to 100% by weight, preferably 3 to 100% by weight.

An amount of the carboxyl-containing monomer also account for 0.2 to 30% by weight, preferably 0.2 to 10% by weight based on the whole core.

The proportions, in the core phase, of the rubbery polymer and said carboxyl-containing polymer may suitably be selected depending on the monomer species employed. In particularly preferred instances, the carboxyl-containing polymer phase accounts for 0.1 to 40% by weight of the whole core phase.

When the amount of the carboxyl-containing polymer is outside the above weight range, the resin compositions produced by melt-blending the resulting core-shell polymer with polyamide resins may show only unsatisfactorily impact strength or they may have a higher melt viscosity, which offers a problem from the moldability viewpoint, as the case may be.

It is possible to insert one or more intermediate phases between the rubbery polymer phase with a glass transition temperature not higher than −30° C. and said carboxyl-containing polymer phase. It is desirable that these intermediate phases have a glass transition temperature lower than the glass transition temperature of the core. The presence of such intermediate phases may result in relaxation of strains in the core-shell polymer at low temperatures, leading to higher impact strength at low temperature.

The above core phase also should preferably account for 50 to 90% by weight based on the whole core-shell polymer, as mentioned hereinbefore.

In the third-step polymerization, a shell is formed. Thus, a monomer or monomers containing neither carboxyl-reactive groups nor amino-reactive groups are polymerized to give a glassy polymer with a glass transition temperature not lower than 40° C.

When the shell phase has a glass transition temperature below 40° C., handling of the core-shell polymer may become very difficult in the steps of removal of water, drying and melt-blending with resins, due to the tackiness of said polymer, hence may become impracticable. The shell phase should preferably have a glass transition temperature not lower than 60° C.

The monomer or monomers to be used in the polymerization for shell formation are the same as those mentioned hereinbefore.

In this case, too, the shell phase should preferably account for 10 to 50% by weight based on the whole core-shell polymer. When the amount of this shell phase is outside the above range, namely below 10% or above 50%, the impact strength of the resin compositions obtained by melt-blending the product core-shell polymer with polyamide resins may not show any satisfactory improvement in some instance.

Whether the core phase is made of a single rubbery polymer phase or of a plurality of phases, the degree of conversion of the core-constituting monomer or monomers should desirably be not less than 96%, preferably not less than 98%. When said degree of conversion is low, carboxyl groups may invade into the shell phase and, as a result, the desired effects may not be produced.

The average particle size of the core-shell polymer produced in the above manner and suited for use is within the range of 100 to 1,000 nm, preferably 100 to 750 nm, more preferably 200 to 500 nm.

The toluene-soluble fraction of said core-shell polymer is not more than about 10% by weight based on the whole core-shell polymer, preferably not more than 8%, more preferably not more than 5%.

When the toluene-soluble fraction is in excess, a shell phase separation from a core phase may occur at low temperatures and/or only an unsatisfactory impact strength may be obtained.

In this invention, each of the core and the shell may have multiple layers. It is important that there are carboxyl group(s) on at least the surface part of the core.

The core-shell polymer according to the invention can be isolated, in a granular, flake or powder form, from the latex produced by a known seed emulsion polymerization method by subjecting said latex to freezing and thawing or salting out and then subjecting the polymer to removal of water by centrifugation and drying.

The core-shell polymer can be obtained from the latex also by spray drying using a spray drier.

Furthermore, the core-shell polymer thus isolated may be subjected to dehydration treatment by various methods, for example heat treatment in a drier in an inert gas atmosphere, heat treatment by passing through an extruder, or application of a dehydrating agent, whereby said core-shell polymer can be converted to the form in which the carboxyl groups in the core at least partly occur in the acid anhydride form.

The core-shell polymer thus isolated may further be pelletized by means of an extruder and pelletizer. The polymer either as such or in pellet form can be melt-blended, as an impact modifier, with resins.

The polyamide resin compositions according to the invention are produced by melt-blending 3 to 40% by weight, preferably 3 to 25% by weight based on the whole polyamide resin composition, of the above-mentioned core-shell polymer with polyamide resins.

When the amount of said impact modifier is below 3% by weight, the resulting resin compositions can hardly show any substantially improvement on the impact strength, as the case may be. When said amount exceeds 40% by weight, the resulting resin compositions may have markedly impaired rigidity and heat resistance.

As the polyamide resins to be used in the practice of the invention, there may be mentioned, for example, aliphatic polyamides, such as polyamide 6, polyamide 6.6, polyamide 6.10, polyamide 11, polyamide 12, and polyamide 6.12, aromatic polyamides, such as polyhexamethylenediamine terephthalamide and polyhexamethylenediamine isophthalamide, and mixtures of or copolymers based on two or more of these. Polyamide 6 is preferred, however.

Polyamide resins are sometimes melt-blended with other resins, such as ABS resins or modified polyolefin resins, to give polymer alloys. In such case, further higher impact strength at low temperature can be attained by the addition, by melt-blending, of the core-shell polymer according to the invention.

Melt-blending with such polyamide-containing polymer alloys of course falls within the scope of the present invention. The amount of the core-shell polymer according to the invention in this case, namely for polymer alloy systems, is also 1 to 40% by weight.

The polyamide resin compositions are produced by melt-blending.

The melt-blending is generally performed in a temperature ranging 200° C. to 300° C. at which the resin is melted and its viscosity is not excessively low.

For polyamide 6, for instance, said temperature range is 230° to 260° C.

The melt-blending can be effected using a heating roll, Banbury mixer, or single- or twin-screw extruder.

Furthermore, the resin compositions according to the invention may contain various additives each in an appropriate amount.

As such additives, there may be mentioned, for instance, flame retardants, mold release agents, weather resistance modifiers, antioxidants, antistatic agents, thermal resistance modifiers, colorants, reinforcing agents, surfactants, inorganic fillers, and lubricants.

The resin compositions obtained by melt-blending the core-shell polymer containing a carboxyl group in the core phase in accordance with the invention with polyamide resins can provide polyamide resin molded articles showing high impact strength at temperatures ranging from room temperature to −30° C. Such high impact strength cannot have ever been attained with the conventional carboxyl-modified core-shell polymers.

The polyamide resin compositions according to the invention show excellent impact strength at low temperature because they have low ductile-brittle temperature and high notched Izod impact strength values in the brittle fracture temperature region.

EXAMPLES AND COMPARATIVE EXAMPLES

The following examples and comparative examples are further illustrative of the present invention but are by no means limitative of the scope of the invention.

In the examples and comparative examples, "part(s)" always means "part(s) by weight".

In the examples and comparative examples, the following abbreviations are used:

| Butadiene | Bd |
|---|---|
| Ethyl acrylate | EA |
| n-Butyl acrylate | BA |
| Methyl methacrylate | MMA |
| Styrene | St |
| Methacrylic acid | MAA |
| Itaconic acid | IA |
| Monoethyl maleate | MAME |
| Allyl methacrylate | AlMA |
| 1,4-Butylene glycol diacrylate | BGA |
| Deionized water | DIW |
| Dioctyl sulfosuccinate sodium salt | SSS |
| Sodium dodecyl biphenyl ether sulfonate | DBES |
| Sodium persulfate | SPS |
| Cumene hydroperoxide | CHP |
| Sodium formaldehydesulfoxylate | SFS |
| Ethylenediaminetetraacetic acid sodium salt | EDTA |
| Sodium hydrogen carbonate | SHC |
| Polyamide 6 | PA6 |
| Glass transition temperature | Tg |

The temperature at which the tanδ value relative to the dynamic viscoelasticity in the 10-Hz tensile mode (measured on an Iwamoto Seisakusho model VEF-3) reached a peak was taken as the glass transition temperature.

The weight-average particle size of each core-shell polymer was measured on a Coulter mode N-4 (Coulter Electronics).

EXAMPLE 1

Production of core-shell polymer A

A 2-liter polymerization vessel equipped with a reflux condenser was charged with 600 g of DIW, 20 g of 1% aqueous solution of SSS and 40 g of 1% aqueous solution of SHC. The resultant mixture was heated to 70° C. with stirring under nitrogen.

A first-step monomer mixture (a) (40 g) having the composition specified below was added to the above mixture and, after 10 minutes of stirring for effecting dispersion, seed polymerization was initiated by adding 85 g of 2% aqueous solution of SPS.

| First-step monomer mixture (a) | |
|---|---|
| BA | 826.6 g |
| AlMA | 1.7 g |
| BGA | 1.7 g |
| First-step monomer emulsion (A) | |
| First-step monomer mixture (a) | 790 g |
| 1% Aqueous solution of SSS | 286 g |
| 1% Aqueous solution of SHC | 45 g |
| First-step monomer emulsion (B) | |
| MAA | 20 g |
| 1% Aqueous solution of SSS | 10 g |
| 1% Aqueous solution of SHC | 10 g |
| DIW | 30 g |

Then, 1,121 g of the first-step monomer emulsion (A) was fed continuously over 150 minutes and 70 g of the first-step monomer emulsion (B) was then further fed over minutes. The resultant mixture was heated to 90° C. and maintained at that temperature for 1 hour for maturation.

After cooling to 70° C., second-step polymerization was effected. Thus, 15 g of 2% aqueous solution of SPS was added and then 269 g of a second-step monomer emulsion having the composition shown below was fed over 60 minutes and the resultant mixture was heated to 90° C. and maintained at that temperature for 1 hour for maturation.

| Second-step monomer emulsion | |
|---|---|
| MMA | 135 g |
| EA | 15 g |
| 1% Aqueous solution of SSS | 54 g |
| 1% Aqueous solution of SHC | 15 g |
| DIW | 50 g |

The reaction mixture was cooled to room temperature and filtered through 300-mesh stainless steel wire gauze to give a core-shell polymer latex with a solid content of 44.5% and a weight-average particle size of 276 nm.

This latex was subjected to freezing and thawing for coagulation and the coagulate was washed with water, water was eliminated and the product dried to give core-shell polymer A.

EXAMPLE 2

Production of core-shell polymer B

A 2-liter polymerization vessel equipped with a reflux condenser was charged with 600 g of DIW, 20 g of 1% aqueous solution of SSS and 40 g of 1% aqueous solution of SHC. The resultant mixture was heated to 70° C. with stirring under nitrogen.

A first-step monomer mixture (40 g) having the composition specified below was added to the above mixture and, after 10 minutes of stirring for effecting dispersion, seed polymerization was initiated by adding 80 g of 2% aqueous solution of SPS.

| First-step monomer mixture | |
|---|---|
| BA | 796.8 g |
| AlMA | 1.6 g |
| BGA | 1.6 g |
| First-step monomer emulsion | |
| First-step monomer mixture | 760 g |
| 1% Aqueous solution of SSS | 280 g |
| 1% Aqueous solution of SHC | 40 g |

The first-step monomer emulsion specified above (1,121 g) was then fed continuously over 150 minutes and the resultant mixture was heated to 90° C. and maintained at that temperature for 1 hour for maturation.

After cooling to 70° C., second-step polymerization was effected. Thus, 10 g of 2% aqueous solution of SPS was added and then 200 g of a second-step monomer emulsion having the composition shown below was fed over 40 minutes and the resultant mixture was heated to 90° C. and maintained at that temperature for 40 minutes for maturation.

| Second-step monomer emulsion | |
| --- | --- |
| MMA | 79.6 g |
| MAA | 20 g |
| BGA | 0.2 g |
| AlMA | 0.2 g |
| 1% Aqueous solution of SSS | 40 g |
| 1% Aqueous solution of SHC | 20 g |
| DIW | 40 g |

After cooling to 70° C., 10 g of 2% aqueous solution of SPS was added and then 190 g of a third-step monomer emulsion having the composition specified below was fed continuously over 40 minutes. The resultant mixture was heated to 90° C. and maintained at that temperature for 1 hour for maturation.

| Third-step emulsion | |
| --- | --- |
| St | 75 g |
| AN | 25 g |
| 1% Aqueous solution of SSS | 40 g |
| 1% Aqueous solution of SHC | 10 g |
| DIW | 40 g |

The reaction mixture was cooled to room temperature and filtered through 300-mesh stainless steel wire gauze to give a core-shell polymer latex with a solid content of 44.4% and a weight-average particle size of 269 nm.

This latex was subjected to freezing and thawing for coagulation and the coagulate was washed with water, water was eliminated and the product dried to give core-shell polymer B.

EXAMPLE 3

Production of core-shell polymer C

Emulsion polymerization was carried out in the same manner as in Example 2 using the charge composition (C) specified in Table 1. The latex obtained was subjected to freezing and thawing for coagulation and the coagulate was washed with water, water was eliminated and the product dried to give core-shell polymer C.

EXAMPLE 4

Production of core-shell polymer D

A 5-liter autoclave was charged with 540 g of DIW and 2.4 g of DBES. The mixture was heated to 50° C. with stirring under nitrogen. 7.5 g of St and 19.5 g of Bd were added and seed polymerization was initiated by adding 0.24 g of CHP and 1.1 g of an activator solution (composed of 5.0 g of SFS, 0.5 g of EDTA, 0.05 g of ferrous sulfate and 50 g of DIW).

After completion of the reaction, 1,000 g of DIW was added and then 2,097 g of a monomer emulsion having the composition specified below, 2.4 g of CHP and 11 g of the same activator solution as mentioned above were continuously fed over 5 hours, 8 hours and 8 hours, respectively, for first-step polymerization.

| First-step monomer emulsion | |
| --- | --- |
| St | 315 g |
| Bd | 1,258 g |
| DBES | 24 g |
| DIW | 500 g |

The first-step polymerization mixture was heated to 70° C. and second-step polymerization was carried out. Thus, 27 g of 2% aqueous solution of SPS was added and then 328 g of a second-step monomer emulsion having the following composition was fed over 40 minutes.

| Second-step monomer emulsion | |
| --- | --- |
| MMA | 159.2 g |
| MAA | 40 g |
| BGA | 0.4 G |
| ALMA | 0.4 g |
| DBES | 1 g |
| 1% Aqueous solution of SHC | 27 g |
| DIW | 100 g |

The reaction mixture was heated to 90° C., maintained at that temperature for 40 minutes for maturation and then cooled to 70° C. Third-step polymerization was then carried out. Thus, 27 g of 2% aqueous solution of SPS was added and 328 g of a third-step monomer emulsion having the following composition was fed over 40 minutes:

| Third-step monomer emulsion | |
| --- | --- |
| MMA | 160 g |
| EA | 40 g |
| DBES | 1 g |
| 1% Aqueous solution of SHC | 27 g |
| DIW | 100 g |

The reaction mixture was heated to 90° C., maintained at that temperature for 1 hour for maturation, then cooled to room temperature and filtered through 300-mesh stainless steel wire gauze to give a core-shell polymer latex with a solid content of 45.1% and a weight-average particle size of 243 nm.

This latex was subjected to freezing and thawing for coagulation and the coagulate was washed with water, water was eliminated and the product dried to give core-shell polymer D.

EXAMPLE 5

Production of polyamide resin composition (1)

Polyamide 6 (Amilan 1017C, manufactured by Toray Co. Ltd.) (100 parts) and 25 parts of core-shell polymer A produced in Example 1 and dried to a water content of not less than 0.03% were melt-blended with each other using a twin-screw extruder PCM-30 (manufactured by Ikegai Iron Works, Ltd.) at a cylinder temperature of 230° C. and a die head temperature of 230° C. to give polyamide resin composition (1) in a pellet form.

EXAMPLES 6 to 9

Production of polyamide resin compositions (2) to (4)

Polyamide resin compositions (2), (3) and (4) were produced by proceeding in the same manner as in Example 5 using core-shell polymers B, C and D, respectively, in lieu of core-shell polymer A in Example 5.

COMPARATIVE EXAMPLES 1 AND 2

Production of core-shell polymers E and F

Core-shell polymers E and F were produced using the compositions (E and F) shown in Table 1, according to Example 1

Core-shell polymer E does not contain a carboxylic group.

Core-shell polymer F is a product with a monocarboxylic acid copolymerized in the shell phase.

COMPARATIVE EXAMPLES 3 AND 4

Production of polyamide resin compositions (5) and (6)

Polyamide resin compositions (5) and (6) were produced in a pellet form by proceeding in the same manner as in Example 5 using core-shell polymers E and F, respectively, in lieu of core-shell polymer A in Example 5.

EXAMPLES 9 TO 11

Production of core-shell polymers G, H and I

Core-shell polymers G, H and I were produced by proceeding in the same manner as in Example 1 using monomers mentioned in Table 1.

EXAMPLES 12 TO 14

Production of polyamide resin compositions (7) to (9)

Polyamide resin compositions (7), (8) and (9) were produced in a pellet form by proceeding in the same manner as in Example 5 using core-shell polymers G, H and I, respectively, in lieu of core-shell polymer A in Example 5.

EXAMPLE 15

Production of polyamide resin composition (11)

Polyamide 6.6 (Amilan 3001-N, manufactured by Toray Co. Ltd.) (100 parts) and 25 parts of core-shell polymer C produced in Example 3 and dried to a water content of not less than 0.03% were melt-blended with each other using a twin-screw extruder PCM-30 (manufactured by Ikegai Iron Works, Ltd.) at a cylinder temperature of 250° C. and a die head temperature of 260° C. to give polyamide resin composition (11) in a pellet form.

EXAMPLES 16 TO 18

Production of polyamide resin compositions (12) to (14)

Polyamide resin compositions (12), (13) and (14) were produced in a pellet form by proceeding in the same manner as in Example 15 using core-shell polymers G, H and I, respectively, in lieu of core-shell polymer C in Example 15.

COMPARATIVE EXAMPLES 5 AND 6

Production of polyamide resin compositions (15) and (16)

Polyamide resin compositions (15) and (16) were produced in a pellet form by proceeding in the same manner as in Example 15 using core-shell polymers E and F, respectively, in lieu of core-shell polymer C in Example 15.

TEST EXAMPLE

Testing for impact strength

Polyamide resin compositions (1) to (6) each in a pellet form were respectively dried at 120° C. for 4 hours and then molded under the conditions mentioned below using a TS-100 injection molding machine (manufactured by Nissei Plastic Industries, Co. Ltd.). The moldings were notched by cutting on a milling machine to give Izod impact test specimens ⅛ inch or 1/4 inch in thickness, as described in JIS K 7113. It is to be noted that polyamide resin (10) and (17) are polyamide resins, per se, namely polyamide 6 (Amilan 1017C, manufactured by Toray Co. Ltd.) and polyamide 6.6 (Amilan 3001-N, manufactured by Toray Co. Ltd.), respectively.

| Cylinder Temperature | Nozzle Temperature | |
|---|---|---|
| 240° C. | 250° C. | Polyamide 6 resin |
| 270° C. | 280° C. | Polyamide 6.6 resin |

These test specimens were tested for impact strength at temperatures of 23° C., 10° C., 0° C., −10° C., −20° C. and −30° C. by the method essentially described in JIS K 7113. The results obtained are shown in Tables 2 and 3.

Measurement of the toluene-soluble fraction

Five g of each core-shell polymer was added to 100 g of toluene and the mixture was allowed to stand at room temperature for 40 hours and then centrifuged on a Hitachi model 70P-72 ultracetrifuge (manufactured by Hitachi Koki Co. Ltd.) for separation at 40,000 rpm for 30 minutes.

The supernatant was transferred to an eggplant-shaped flask, the toluene was removed using an evaporator and, after further drying under vacuum at 80° C for 30 hours, the residue in the eggplant-shaped flask was weighed. The toluene-soluble fraction was calculated as follows Toluene-soluble fraction (% by weight) =

$$\frac{\text{Weight (g) of residue in eggplant-shaped flask}}{\text{Weight (g) of core-shell polymer exposed to toluene}} \times 100$$

TABLE 1

| Example | 1 | 2 | 3 | 4 | Comparative Example 1 | Comparative Example 2 |
|---|---|---|---|---|---|---|
| Core-shell polymer (Weight ratio) | A | B | C | D | E | F |
| Core (rubbery polymer) | 85 | 80 | 80 | 85 | 80 | 80 |
| Core (intermediate phase) | | 10 | 10 | | | |

TABLE 1-continued

| | | | | | | |
|---|---|---|---|---|---|---|
| Shell | 15 | 10 | 10 | 15 | 20 | 20 |
| Core | | | | | | |
| Composition of rubbery polymer (weight ratio) | | | | | | |
| BA | 97.2 | 99.6 | 99.6 | | 99.6 | 99.6 |
| BGA | 0.2 | 0.2 | 0.2 | 0.2 | 0.2 | 0.2 |
| AlMA | 0.2 | 0.2 | 0.2 | 0.2 | 0.2 | 0.2 |
| 2EHA | | | | | | |
| Bd | | | | 80.0 | | |
| St | | | | 19.6 | | |
| MAA | 2.4 | | | | | |
| Tg of rubbery polymer (°C.) | −35.0 | −39.0 | −40.0 | −46.0 | −39.0 | −40.0 |
| Composition of intermediate phase (weight ratio) | | | | | | |
| MAA | | 20.0 | | 20.0 | | |
| IA | | | 10.0 | | | |
| MMA | | 79.6 | 90.0 | 79.6 | | |
| BGA | | 0.2 | | 0.2 | | |
| AlMA | | 0.2 | | 0.2 | | |
| Composition of shell (weight ratio) | | | | | | |
| MMA | 90.0 | | 80.0 | 80.0 | 80.0 | 80.0 |
| EA | 10.0 | | 20.0 | 20.0 | 20.0 | 10.0 |
| MAA | | | | | | 10.0 |
| St | | 75.0 | | | | |
| AN | | 25.0 | | | | |
| Tg of shell (°C.) | 113.0 | 121.0 | 105.0 | 106.0 | 105.0 | 110.0 |
| Toluene-soluble Fraction (%) | 4.2 | 4.5 | 4.3 | 4.6 | 4.2 | 4.5 |
| Heat Treatment | none | none | none | none | none | none |

| Example | 9 | 10 | 11 |
|---|---|---|---|
| Core-shell polymer | G | H | I |
| (Weight ratio) | | | |
| Core (rubbery polymer) | 80 | 80 | 80 |
| Core (intermediate phase) | | | |
| Shell | 20 | 20 | 20 |
| Core | | | |
| Composition of rubbery polymer (weight ratio) | | | |
| BA | 98.1 | 98.1 | 98.1 |
| BGA | 0.2 | 0.2 | 0.2 |
| AlMA | 0.2 | 0.2 | 0.2 |
| IA | 2.5 | | 2.5 |
| MAME | | 2.5 | |
| Tg of rubbery polymer (°C.) | −37.0 | −38.0 | −37.0 |
| Composition of intermediate phase | none | none | none |
| Composition of shell (weight ratio) | | | |
| MMA | 80.0 | 80.0 | 80.0 |
| EA | 20.0 | 20.0 | 20.0 |
| Tg of shell (°C.) | 106.0 | 105.0 | 105.0 |
| Toluene-soluble Fraction (%) | 3.9 | 4.1 | 3.8 |
| Heat Treatment | none | none | done |

TABLE 2

| Example | 5 | 6 | 7 | 8 | Comparative Example 3 | Comparative Example 4 |
|---|---|---|---|---|---|---|
| Polyamide resin | (1) | (2) | (3) | (4) | (5) | (6) |
| a) core-shell polymer | A | B | C | D | E | F |
| b) polyamide resin | PA6 | PA6 | PA6 | PA6 | PA6 | PA6 |
| Ratio a)/b) | 80/20 | 80/20 | 80/20 | 80/20 | 80/20 | 80/20 |
| Notched Izod Impact Strength value (kgfcm/cm) | | | | | | |
| ⅛ inch thick | | | | | | |
| 23 (°C.) | 90.2 | 91.5 | 90.5 | 88.2 | 31.1 | 85.1 |
| 10 (°C.) | 85.2 | 80.3 | 84.3 | 80.2 | 24.5 | 42.1 |
| 0 (°C.) | 81.3 | 74.1 | 80.6 | 78.3 | 20.1 | 32.1 |
| −10 (°C.) | 48.5 | 35.1 | 77.6 | 74.5 | 18.2 | 26.3 |
| −20 (°C.) | 29.0 | 26.5 | 32.0 | 29.7 | 16.5 | 22.6 |
| −30 (°C.) | 26.1 | 24.5 | 25.0 | 28.1 | 14.1 | 17.6 |
| ¼ inch thick | | | | | | |
| 23 (°C.) | 74.6 | 70.1 | 74.2 | 78.1 | 29.1 | 35.1 |
| 10 (°C.) | 31.2 | 28.6 | 30.5 | 33.1 | 23.0 | 27.1 |
| 0 (°C.) | 26.8 | 24.1 | 26.7 | 28.7 | 20.8 | 24.1 |
| −10 (°C.) | 23.0 | 22.8 | 24.6 | 26.7 | 17.6 | 21.0 |
| −20 (°C.) | 22.8 | 20.6 | 23.7 | 24.0 | 16.1 | 18.4 |
| −30 (°C.) | 20.8 | 18.6 | 20.1 | 21.9 | 14.7 | 15.9 |
| Example | 12 | | 13 | | 14 | Control |

TABLE 2-continued

| Polyamide resin | (7) | (8) | (9) | (10) |
|---|---|---|---|---|
| a) core-shell polymer | G | H | I | |
| b) polyamide resin | PA6 | PA6 | PA6 | PA6 |
| Ratio a)/b) | 80/20 | 80/20 | 80/20 | 100/0 |
| Notched Izod Impact Strength value (kgfcm/cm) | | | | |
| ⅛ inch thick | | | | |
| 23 (°C.) | 90.2 | 88.5 | 102.4 | 7.8 |
| 10 (°C.) | 85.4 | 82.1 | 90.4 | 7.2 |
| 0 (°C.) | 80.7 | 74.3 | 82.4 | 6.5 |
| −10 (°C.) | 78.5 | 58.2 | 79.5 | 6.7 |
| −20 (°C.) | 35.1 | 32.1 | 41.2 | 6.4 |
| −30 (°C.) | 27.1 | 26.4 | 31.2 | 5.8 |
| ¼ inch thick | | | | |
| 23 (°C.) | 80.2 | 80.4 | 94.2 | 5.4 |
| 10 (°C.) | 36.1 | 32.8 | 40.1 | 4.8 |
| 0 (°C.) | 28.4 | 26.4 | 31.4 | 4.3 |
| −10 (°C.) | 24.5 | 23.7 | 28.7 | 4.1 |
| −20 (°C.) | 23.1 | 21.7 | 24.1 | 4.2 |
| −30 (°C.) | 21.5 | 19.7 | 22.1 | 4.0 |

Note) PA6: Polyamide 6 (Amilan 1017-C, manufactured by Toray Industries. Inc.)

TABLE 3

| Example | 15 | 16 | 17 | 18 | Comp. Ex. 5 | Comp. Ex. 6 | Control |
|---|---|---|---|---|---|---|---|
| Polyamide resin | (11) | (12) | (13) | (14) | (15) | (16) | (17) |
| a) core-shell polymer | C | G | H | I | E | F | |
| b) Polyamide resin | PA66 | PA66 | PA66 | PA66 | PA66 | PA66 | PA66 |
| Ratio a)/b) | 80/20 | 80/20 | 80/20 | 80/20 | 80/20 | 80/20 | 100/0 |
| Notched Izod Impact Strength value (kgfcm/cm) | | | | | | | |
| ⅛ inch thick | | | | | | | |
| 23 (°C.) | 90.2 | 91.5 | 90.5 | 92.4 | 19.5 | 21.0 | 5.4 |
| 10 (°C.) | 36.4 | 40.7 | 35.4 | 43.1 | 15.4 | 18.4 | 5.2 |
| 0 (°C.) | 28.5 | 29.4 | 28.1 | 34.1 | 13.4 | 16.4 | 4.9 |
| −10 (°C.) | 25.4 | 27.5 | 24.2 | 28.4 | 12.1 | 15.7 | 4.6 |
| −20 (°C.) | 22.1 | 24.5 | 21.0 | 26.7 | 9.7 | 13.2 | 4.3 |
| −30 (°C.) | 20.1 | 21.4 | 17.5 | 24.5 | 8.4 | 12.4 | 4.5 |
| ¼ inch thick | | | | | | | |
| 23 (°C.) | 29.1 | 30.4 | 26.7 | 36.4 | 17.5 | 17.5 | 4.8 |
| 10 (°C.) | 27.1 | 28.6 | 25.5 | 33.1 | 16.4 | 16.7 | 4.5 |
| 0 (°C.) | 25.7 | 24.1 | 23.1 | 28.7 | 14.2 | 15.0 | 4.1 |
| −10 (°C.) | 20.4 | 22.8 | 20.1 | 26.7 | 13.4 | 14.7 | 4.2 |
| −20 (°C.) | 18.4 | 20.6 | 18.4 | 24.0 | 12.0 | 12.1 | 3.8 |
| −30 (°C.) | 17.5 | 18.6 | 16.7 | 21.9 | 9.1 | 9.7 | 3.6 |

Note) PA66: Polyamide 6.6 (Amilan 3001-N, manufactured by Toray Industries, Inc.)

What is claimed is:

1. A core-shell polymer which comprises
   (1) a core which is a rubbery polymer containing
      (a) an inner phase selected from the group consisting of
         (i) a copolymer of butadiene with styrene, and
         (ii) a polymer of an alkyl acrylate containing 2 to 8 carbon atoms in the alkyl moiety, and
      (b) an external phase which is a copolymer of methyl methacrylate with methacrylic acid or itaconic acid, with the proviso that when not more than 20 wt% of butadiene is employed in the core, the polymerization is carried out in the presence of an alkane polyol poly(meth)acrylate as a cross linking monomer and an allyl(meth) acrylate as a grafting monomer, and
   (2) a shell phase which is a glassy polymer selected from the group consisting of
      (i) a copolymer of styrene with acrylonitrile; and
      (ii) a copolymer of methyl methacrylate and an alkyl acrylate having up to 4 carbon atoms in the alkyl moiety,
   the toluene-soluble fraction of the core-shell polymer accounting for not more than 10% by weight based on the whole core-shell polymer.

2. A core-shell polymer as claimed in claim 1, wherein an amount of the core is from 50 to 90% by weight based on the whole core-shell polymer and an amount of the shell is from 10 to 50% by weight based on the whole core-shell polymer.

3. A core-shell polymer as claimed in claim 1, wherein glass transition temperatures of the rubbery polymer phase in the core and the shell are not higher than −30° C. and not lower than 40° C., respectively.

4. A polyamide resin composition which comprises the core-shell polymer as claimed in claim 1.

5. A polyamide resin composition as claimed in claim 4, wherein the amount of the core-shell polymer is from 3 to 40% by weight based on the whole composition.

6. A molded article produced by molding the polyamide composition as claimed in claim 4.

* * * * *